Feb. 26, 1952 D. A. WHITMAN 2,587,259
SAUCER
Filed Aug. 19, 1949
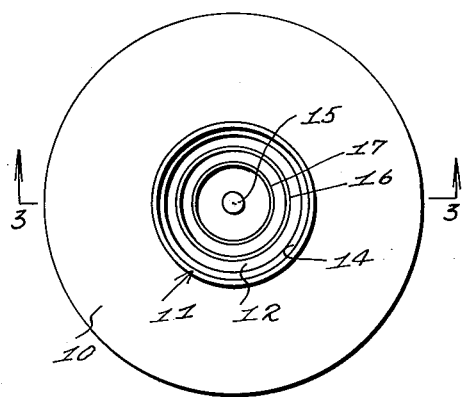
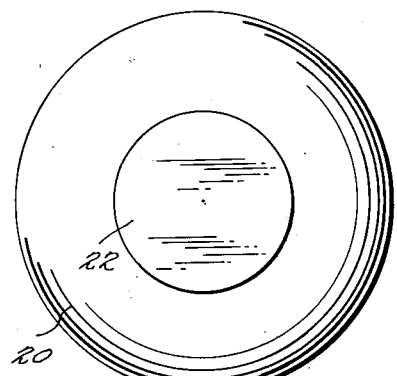
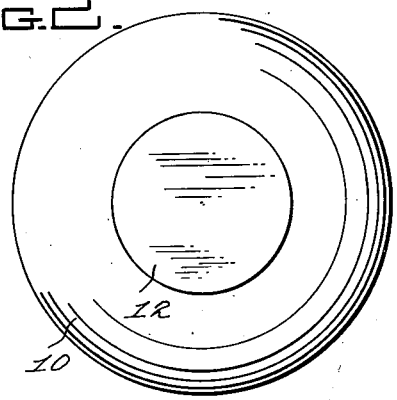
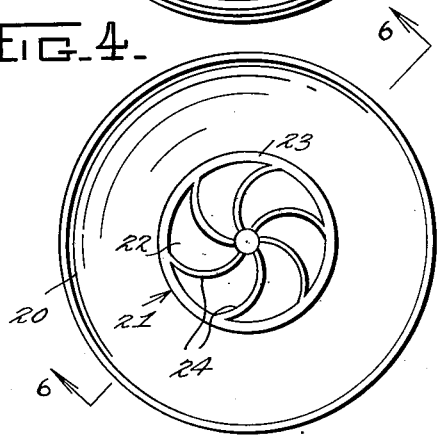
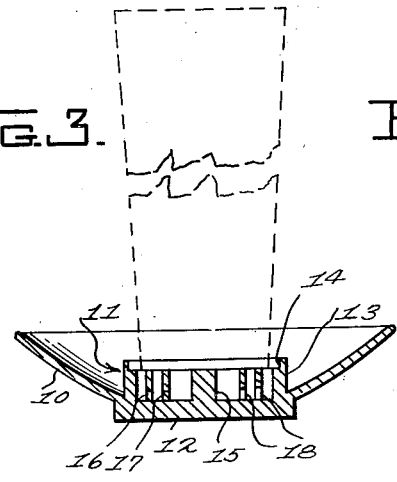
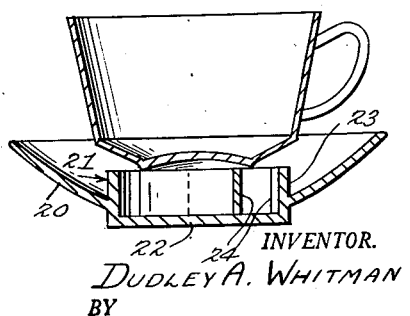
INVENTOR.
DUDLEY A. WHITMAN
BY
McMorrow, Berman & Davidson
ATTORNEYS Patented Feb. 26, 1952

2,587,259

UNITED STATES PATENT OFFICE 2,587,259

SAUCER

Dudley A. Whitman, Miami Beach, Fla.

Application August 19, 1949, Serial No. 111,213

1 Claim. (Cl. 65—15)

This invention relates to saucers, and more particularly to a saucer provided with a receptacle and a cup support in the receptacle for maintaining the bottom of a cup supported on the saucer free of liquid, to thereby avoid dripping of the liquid when the cup is used.

It is among the objects of the invention to provide a drip-preventing saucer arranged to support a cup above a receptacle, so that any liquid on the outside of the cup will drain from the cup into the receptacle and will not drip from the cup while it is in use, which saucer may be of conventional size and shape, and may be of unitary, one-piece construction and formed of ceramic material, such as is generally used in the manufacture of table china, which has a receptacle of ample capacity to receive liquid spilling over the rim of an over-filled cup or the liquid of condensation from a glass containing an iced drink, which has in the receptacle a supporting structure which will firmly support a cup or glass in upright position and at the same time, permit liquid from the outside of such cup or glass to freely drain into the receptacle and seek a common level in the receptacle, and which is simple and durable in construction, economical to manufacture, easy to clean, and neat and attractive in appearance.

Other objects and advantages will become apparent from a consideration of the following description and the appended claim in conjunction with the accompanying drawing, wherein:

Figure 1 is a top plan view of a saucer illustrative of the invention;

Figure 2 is a bottom plan view of the saucer illustrated in Figure 1;

Figure 3 is a cross-section on the line 3—3 of Figure 1, a glass being shown in broken lines in operative position on the saucer;

Figure 4 is a top plan view of a somewhat modified form of saucer;

Figure 5 is a bottom plan view of the saucer illustrated in Figure 4; and

Figure 6 is a transverse cross-section of the saucer on the line 6—6 of Figure 4, and also shows in cross-section a cup operatively supported on the saucer.

With continued reference to the drawing, and particularly to Figures 1, 2 and 3, the saucer comprises an annular rim 10 of thin-walled, concavo-convex formation, and a receptacle, generally indicated at 11, disposed at the center of the rim and including a rib formation for supporting a cup or glass in upright position.

The receptacle 11 has a flat bottom wall 12 which is substantially continuous with the rim 10 and a continuous, substantially cylindrical side wall 13 which projects substantially perpendicularly from the bottom wall 12 at the juncture of this bottom wall with the rim 10 and into the concave side of the rim. The wall 13 has a height materially less than the concave depth of the rim 10, and is provided in its end opposite the bottom wall 12 with an internal, annular recess 14 of right-angle formation providing an annular ledge or shoulder around the interior of this wall.

The rib formation comprises a plurality of thin-walled, concentric rings which extend from the bottom wall 12 substantially perpendicular to the bottom wall to a common plane which includes the ledge provided by the recess 14, and a cylindrical center post of stem 15 at the center of the bottom wall. In the arrangement shown, there are two spaced-apart, thin-walled, circular ribs 16 and 17, but it is to be understood that the number of ribs can be varied without, in any way, exceeding the scope of the invention.

The upper edges of the ribs 16 and 17, the upper end of the center post 15, and the shoulder provided by the recess 14, provide a support for the bottom of a glass or cup, and any fluid on the exterior of the glass or cup is free to flow downwardly from the cup into the receptacle 11. The ribs 16 and 17 and the post 15 facilitate this flow of liquid from the cup or glass by capillary attraction of the liquid, and adjacent the bottom wall 12 the ribs are provided with apertures 18 through which liquid may pass, so that the liquid in the receptacle 11 may freely seek a common level.

In the somewhat modified arrangement shown in Figures 4, 5 and 6, the saucer has an annular, concavo-convex rim 20, and a receptacle, generally indicated at 21, at the center of the rim.

The receptacle 21 has a flat bottom wall 22 which is substantially continuous with the rim 20 and has a cylindrical side wall 23 which extends marginally from the bottom wall 22 substantially perpendicular to the latter and into the concave side of the rim 20. The side wall 23 has a height materially less than the concave depth of the rim 20, and together with the bottom wall constitutes the drip-receiving receptacle at the center of the saucer. A plurality of spiral vanes 24 are disposed within the receptacle and extend substantially perpendicularly from the bottom wall 22 to a plane which includes the edge of the side wall 23 remote from the bottom wall. These vanes are spaced around the side wall of the receptacle at substantially equal, angular intervals, and extend from the side wall to respective locations adjacent the center of the receptacle. Preferably, the vanes 24 are spirally curved from the side wall to the locations near the center of the receptacle and are formed integrally with the side wall and bottom wall of the receptacle.

In both cases the saucer is preferably formed of glass or a suitable ceramic material and is unitary or integral in construction.

While a particular form of rim has been shown for the saucer, it is to be understood that this rim may be modified, if desired, and the device used either as a saucer or a coaster.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A saucer comprising an annular rim of concavo-convex shape, a receptacle at the center of said rim comprising a flat bottom wall substantially continuous with said rim and a substantially circular side wall extending marginally from said bottom wall substantially perpendicular thereto at the concave side of said rim, and a rib formation in said receptacle extending from said bottom wall to a plane including an edge surface of said side wall remote from said bottom wall, said rib formation comprising at least two circular ribs of elongated rectangular cross sectional shape, concentric with said side wall and with each other and extending substantially perpendicularly from said bottom wall, and a center post extending from said bottom wall at the center thereof and substantially concentric with said ribs.

DUDLEY A. WHITMAN.

REFERENCES CITED

The following references are of record in the file of this patent:

UNITED STATES PATENTS

| Number | Name | Date |
| --- | --- | --- |
| D. 46,005 | Palmer | June 23, 1914 |
| D. 91,501 | Roe | Feb. 13, 1934 |
| D. 115,399 | Heath | June 27, 1939 |
| D. 137,118 | Kleinberg | Jan. 25, 1944 |
| 1,002,509 | Fitz | Sept. 5, 1911 |
| 1,614,338 | Awoki | Jan. 11, 1927 |
| 1,662,146 | Elliott | Mar. 13, 1928 |
| 2,427,487 | Alexander | Sept. 16, 1947 |

FOREIGN PATENTS

| Number | Country | Date |
| --- | --- | --- |
| 15,022 | Great Britain | Aug. 22, 1900 |
| 18,899 | Switzerland | Sept. 29, 1899 |
| 19,337 | Great Britain | Sept. 26, 1899 |
| 137,982 | Switzerland | Apr. 16, 1930 |
| 304,025 | Great Britain | Jan. 17, 1929 |
| 444,421 | Great Britain | Mar. 20, 1936 |
| 658,314 | France | Jan. 25, 1929 |